Sept. 6, 1949.  C. D. GIBSON  2,480,916
ELEVATING MECHANISM
Filed Feb. 20, 1945  2 Sheets-Sheet 1
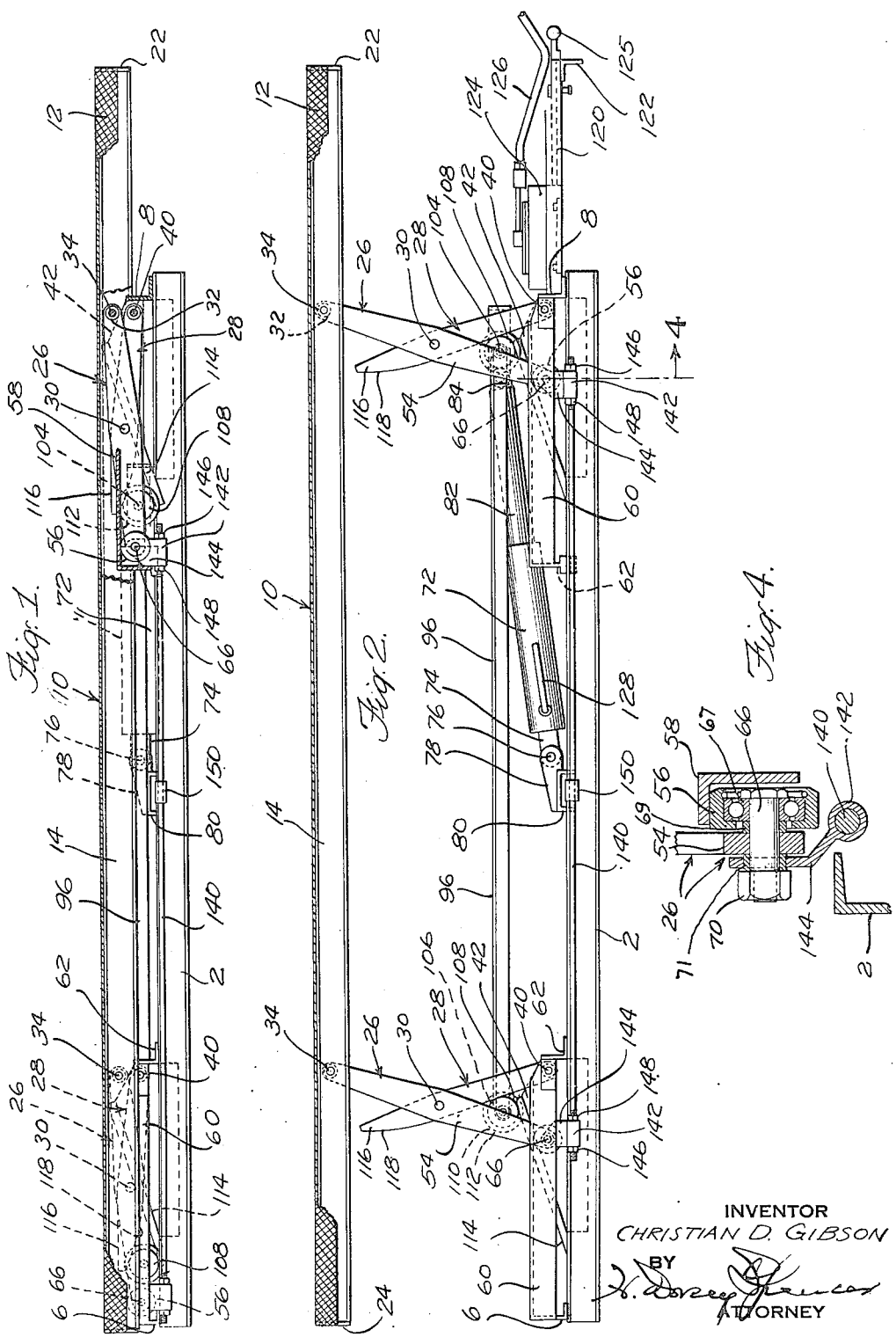
INVENTOR
CHRISTIAN D. GIBSON
BY
ATTORNEY

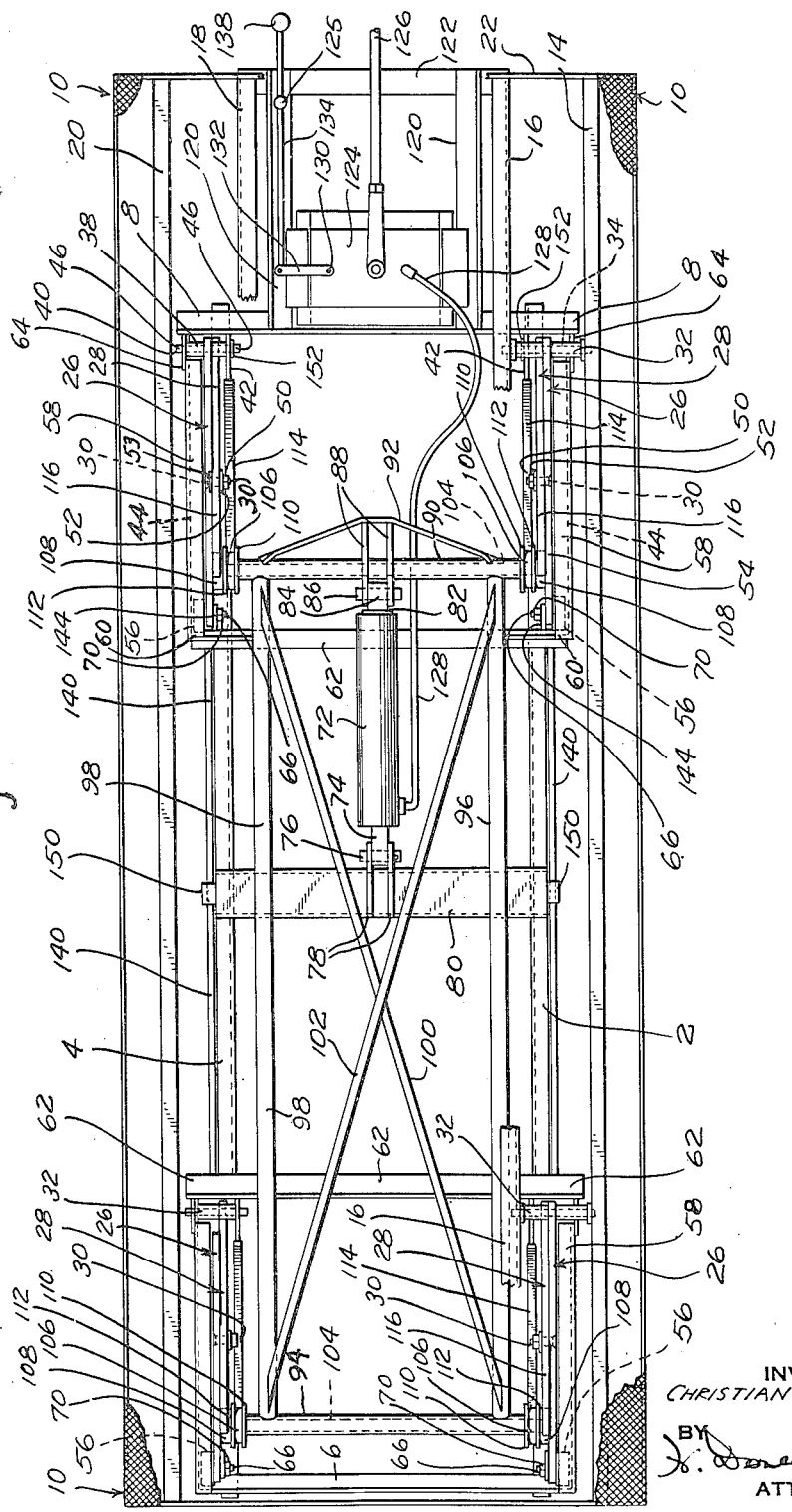

Patented Sept. 6, 1949

2,480,916

UNITED STATES PATENT OFFICE 2,480,916

ELEVATING MECHANISM

Christian D. Gibson, Greene, N. Y., assignor to Lyon-Raymond Corporation, Greene, N. Y., a corporation of New York Application February 20, 1945, Serial No. 578,916

16 Claims. (Cl. 187—17)

This invention relates to platform or other load carrier elevating means and particularly to means capable either of elevating a platform or other load carrier having a load thereon from a position in which the entire height of the platform, the elevating mechanism and the support therefor is extremely low to a quite substantial elevation above its minimum elevation or of gradually lowering the elevated loaded platform or other load carrier to said position of minimum elevation, the invention aiming generally to provide elevating mechanism, of lower than usual collapsed height, which is also of such capacity that it may gradually lift or gradually lower loads of substantial amounts through a considerable range of movement.

Not only does the invention aim to provide platform or other load carrier elevating means capable of operating effectively from an extremely low collapsed height throughout a considerable range of elevating and lowering movement, but it further aims so to control the elevation and lowering of the platform or other load carrier that it is maintained in both vertical and horizontal parallelism throughout its elevating and lowering movements. In the following specification and claims the term "platform" will be used broadly to include any kind of load carrier or support.

Among the problems to the solution of which the invention is directed is the provision of a vertically adjustable platform for railway express trucks to meet the various conditions under which such trucks have to be used. These trucks, as now usually constructed and as they have been employed for a great many years, have platforms arranged usually at a predetermined height above the wheel base, this height being a compromise between a height at which the express packages may readily be loaded upon the truck at the station preparatory to shipment and the height of the express car floor above the wheel base of the truck at the point where the truck is drawn up alongside the car into which the express packages are to be transferred.

Because of the impossibility of predesigning a truck having a platform at a fixed height which will satisfactorily meet the varying conditions of express transfer from the truck to the car and from the car to the truck, considerable difficulty and delay have been experienced in the loading and unloading of heavy express shipments. Moreover, needless muscular labor has been required to load heavy shipments, such as safes, machine parts, airplane motors, etc. upon express cars from the standard express truck and to unload them from the express car onto such standard truck.

One of the objects of the present invention, therefore, is to provide an elevating platform, suitable for use with express trucks and preferably readily adaptable to the chassis of existing trucks, which is so constructed and designed that the platform can be elevated from a lowered position, in which its height above the wheel base does not substantially exceed the height of the present truck platforms, to a position in which it is substantially at the car floor level under a wide variety of local conditions. Although the invention is herein shown as embodied in platform elevating mechanism of a design which is well adapted to solve the problem of elevating the platform of an express truck, it will be obvious that the invention has a wide range of utility in the material handling field and is in no way confined to the field of its illustrative embodiment. More particularly the invention aims to provide platform elevating mechanism which comprises a system of power applying levers or links so arranged that not only can the maximum lifting effort be exerted in all positions of vertical adjustment of the platform but the platform itself will be confined to an elevating movement both in vertical and in horizontal parallelism to itself.

An important feature of the invention is the control of the operation of the toggle joints or linkages, which are employed to effect the raising and lowering of the platform, in such manner that the platform is confined to a raising and lowering movement in vertical parallelism, thus avoiding any necessity for vertical fixed guides for the platform. Not only does the control of the operation of the toggle joints or linkages just referred to insure elevation of the platform in vertical parallelism but a further important feature of the invention is the extension of this control to insure elevation of the platform in horizontal parallelism.

Another important feature of the invention is the construction and arrangement of the levers and/or links, through which the lifting of the platform and its confinement to movement in vertical parallelism are brought about, and the application of the power thereto in such manner that, in substantially all positions of the platform, the lifting effect produced for a given application of power will be approximately the same.

Still another important feature of the invention is the provision, in elevating mechanism for the purposes set forth, of hydraulic means for applying lifting power to the toggle joints or linkages, which hydraulic means are so arranged that the thrust is substantially horizontal at the beginning of the lifting movement, in combination with ramps, associated with the respective toggle joints or linkages, up which the power applying elements of the hydraulic means are arranged to travel to insure effective lifting leverage at all stages of the elevating operation.

Other objects and important features of the invention, to which specific reference has not been made hereinabove, will appear hereinafter when the following description and claims are considered in connection with the accompanying drawings, in which Figure 1 is a side elevation of a supporting frame, which may be substituted for or constitute the chassis top frame of an ordinary express truck or which may be used for any other purpose, this frame having mounted thereon an elevating platform and elevating mechanism therefor embodying the present invention, the platform being shown in this view in its lowermost position;

Figure 2 is a side elevation of the mechanism shown in Figure 1, with the platform in raised position, this view showing the platform approximately at its upper limit of movement;

Figure 3 is a plan view of the mechanism shown in Figure 1, and

Figure 4 is a detail section on the line 4 of Figure 2.

In the illustrative embodiment of the invention the supporting frame for the elevating mechanism, which, as above suggested may be the chassis top frame of an express truck, is shown as comprising the usual side frame members 2 and 4, which may be channel sections, and end frame members 6 and 8, which may be L sections, the frame members being bolted, riveted, welded or otherwise secured permanently together, the illustrated construction having the frame members preferably welded together. The frame thus described constitutes the support for the elevating mechanism and the elevating platform which constitute the subject-matter of the present invention now to be described.

The elevating platform may comprise a goods supporting top plate 10 of steel or other suitable material having overhanging sides 12, the platform 10 being carried upon a frame comprising four longitudinal channels 14, 16, 18 and 20 welded or otherwise suitably connected to the platform, said channels being inter-connected at their ends, as, for example, by the overhanging ends 22 and 24 of the platform. The web faces of the respective pairs of channels 14 and 16 and 18 and 20 are preferably on their adjacent sides to receive the pivots or pivot shafts of the lifting links hereinafter to be described.

The elevating or lifting action of the elevating or lifting mechanism of the present invention is basically a toggle action, but the toggle mechanism is modified to avoid the necessity for providing vertical guides for the platform to insure its elevation in vertical parallelism. It will be obvious that if vertical guides were to be provided they would have to extend a distance below the chassis top equal to the amount of elevation provided for the platform 10 and thus might interfere with the running gear of a truck upon which the support is mounted. Moreover, if the support were to be mounted upon a floor or other flat surface such guides would increase the collapsed height of the elevating mechanism and its support.

To insure movement of the platform 10 in vertical parallelism during the straightening movement of the toggle joints or linkages through which the elevation is effected, without the necessity for providing vertical guides for the platform, is one of the important features of the present invention. As herein shown, each of the toggle joints or linkages making up the elevating or lifting mechanism, there being four altogether, one for each corner of the platform, comprises a platform connected link or lever 26 and a support connected link or lever 28, these two links or levers being pivotally connected to each other at 30 to form the knee joint of the toggle. As shown in Figure 3 the platform connected link or lever 26 is provided at its upper end with a hub 32 so constructed as to space the link or lever 26 substantially equally from the webs of the channels 14 and 16, or from the webs of the channels 18 and 20, the entire length of the hub 32 equalling the space between these respective pairs of webs. The pivot for the hub 32 and link 26 comprises a pivot pin or shaft 34 having a bearing fit within the hub 32 and extending through the webs of the channels 14 and 16, or 18 and 20, sufficiently to receive cotter pins 36 by which it may be secured in bearing supporting relation to the hub 32.

The link or lever 28, which is pivotally connected to the truck chassis top or other support for the elevating mechanism, is also provided with a hub 38 having its bearings upon a pivot pin 40 and extending through webs 42 and 44, hereinafter more fully described, and likewise secured in bearing relation to the hub 38 by cotter pins 46. The pivotal connection between the links or levers 26 and 28, forming the knee joint of the toggle, may be constituted, as shown, by a stud 30 welded to the link or lever 28 and having a nut 50 upon its threaded end bearing against washer 52, a spacing washer 53 being also located on the stud 30 between the links or levers 26 and 28.

To insure elevation of the platform 10 in vertical parallelism, the toggle mechanism so far described is modified to prevent movement of the pivot 34 lengthwise of the truck during its upward and downward movements. To this end the link or lever 26 is provided with an extension 54 beyond the knee joint 30 of the toggle, on which extension is pivotally mounted a roller 56 arranged to travel on the under side of a horizontal track 58 constituted by the horizontal flange on an L section 60 welded or otherwise secured at one end to a crossbar 62 on the chassis top frame or other support for the elevating mechanism and at its other end to the L section end frame member 6 or 8 of the support frame. As hereinabove pointed out, the pivot 40 for the hub 38 of the link 28 extends through the vertical web portion 44 of this track-carrying L section and, at the point where the pivot 40 extends through this web 44, the web is preferably reinforced, as shown, by a reinforcing strip 64.

The pivot 66 for the roller 56, which, as shown, may be constituted by a bolt having a ball raceway 67 a spacing washer 69 and a second spacing washer 71 clamped thereon, together with a link or lever 26, by a nut 70, has its axis spaced from the axis of the pivot 30 the same distances as the axis of the pivot 30 is spaced from the axis of the pivot 34. Likewise the axis of the pivot 30 is spaced from the axis of the pivot 40 the same distance as the spacing between the axis of the pivot 30 and the axis of the pivot 34 and between the axis of the pivot 30 and the axis of the pivot 66. Since the horizontal track 58 confines the axis of the pivot 66 to movement in a horizontal plane throughout the straightening and collapsing movements of the associated platform lifting and lowering toggle joint or linkage, it will be seen that, with the relations given, the pivot 34 is necessarily confined to a vertical movement during both the elevating and the lowering movements of the platform. This, therefore, insures elevation and lowering of the platform in vertical parallelism.

Coming now to the mechanism for effecting the toggle straightening and platform elevating movements of the links or levers 26 and 28, the means for applying elevating power to the toggle joints or linkages are preferably hydraulically operated. As herein shown a hydraulic cylinder 72 has, preferably formed integral therewith or welded thereto, an eye stem 74 mounted on a pivot 76 extending through ears 78 welded to a cross channel 80, in turn welded to the side members 2 and 4 of the support for the elevating mechanism. The plunger 82 of the hydraulic power applying means, which is slidable in the cylinder 2 and is fitted to act as a hydraulic piston, has at its forward end an eye extension 84 which receives a pivot 86 passing through ears 88 embracing and welded to the tubular cross member 90 of a roller carrying frame, hereinafter to be described, the ears 88 extending beyond the tube 90 where they are secured to a reinforcing or bridging strap 92 welded at its ends to the tube 90. The purpose of the strap 92 is to form, with the ears 88, a bridge reinforcing the tube 90 against the end thrust of the plunger 82 in the platform elevating operation.

To insure simultaneous and equal application of lifting power to the toggle joints or linkages, a frame is provided through which the thrust of the plunger 82 is transmitted simultaneously to all four of said toggle joints or linkages. The tubular member 90 constitutes the forward member of this frame and the rear member is constituted by a second tubular member 94. Connecting the front and rear tubular members 94 are side members 96 and 98, which may be of tubular section. The frame is preferably also diagonally braced by diagonal bracing members 100 and 102 of flat section. Extending through the front and rear tubular members 90 and 94 of the thrust transmitting frame just described are pivot shafts 104 on each end of which are mounted, to turn freely and independently of each other, rollers 106 and 108. The rollers 106 are each provided with a flange 110 and the rollers 108 are each provided with a flange 112.

As shown particularly in Figure 3, each roller 106 is arranged to travel up an inclined track or ramp 114 and each roller 108 is arranged to engage an edge of the link or lever 28. In order that the elevating or lifting mechanism may be collapsed into as small a vertical space as possible and yet have provision for application thereto, through the plunger 82 and the roller-carrying frame just described, of an effective lifting force, the link or lever 28 has an extension 116 beyond the knee joint 30 of the toggle, this extension being provided with a cam edge 118. From an inspection of Figure 1 it will be seen that, when the lifting mechanism is in its completely collapsed condition, the roller 106 is at the very bottom of the ramp 114 and the roller 108 bears against the cam edge 118. It will further be seen that the roller 56 on the extension 54 of the link or lever 26 is at the extreme left hand end of its path of travel. Moreover, in this completely collapsed condition of the elevating mechanism the cylinder 72 and plunger 82 are in a horizontal position. In this position it is obvious that, unless the link 28 were provided with the extension 116 having the cam edge 118 thereon, the horizontal thrust of the plunger 82 would exert substantially no platform lifting force on the toggle joint. Not only does the mechanism illustrated and described obviate any such dead center condition, but it insures the application of a substantially uniform lifting effort throughout the entire thrust of the plunger 82, thus insuring a gradual and substantially uniform elevation of the platform 10 with its load.

From the foregoing description it will be seen that, when the plunger 82 of the hydraulic power applying means starts to move from its substantially completely telescoped position in Figure 1 to apply power to the lifting mechanism, the roller 108, which engages the cam edge 118 of the extension 116 of the link or lever 28 of the toggle joint, is moved both forwardly and upwardly by reason of the fact that it is carried on the same shaft 104 on which the roller 106 is carried. Since the roller 106 is travelling up the ramp 114, as the plunger 82 moves forward, the action is somewhat like a scissors action. The power applied to the extension 116 of the link or lever 28 through the engagement of the roller 108 therewith is transmitted through the knee joint 30 of the toggle to the link 26 and, therefore, as the link or lever 28 swings about its pivot 40, the link 26 is caused to swing equally about its pivot 34, the movement of the pivot 34 away from the pivot 40 being confined to a vertical movement by reason of the engagement of the roller 56 with the under side of the track 58.

It will thus be seen that, when the roller 108, carried on the pivot shaft of the roller 106, has travelled with said roller 106 sufficiently up the ramp 114 so that it reaches that part of the edge of the link or lever 28 which is adjacent to the pivot 30, it will, at this point, be exerting a direct toggle straightening action on the knee joint of the toggle. Up to this point it has been causing the link or lever 28 to act as a lever of the second class in moving the knee joint 30 in its toggle straightening direction. However, after passing the point at which it exerts a direct toggle straightening action on the knee joint 30 of the toggle, it will be seen, as shown in Figure 2, that the further thrust of the plunger 72 will apply the hydraulic lifting power through the link or lever 28 acting as a third class lever. The overall effectiveness of the application of the power will, however, be about the same since the thrust is more direct and the toggle action more effective as the lever 28 rocks about its pivot, in a clockwise direction in Figure 2, and the roller 106 rides up the ramp 114.

As shown in the drawings, the means for supplying the cylinder 72 with liquid under pressure is preferably carried on the support for the elevating mechanism. As shown in Figure 3 an extension, made up of side members 120, which may be of L section, and of a cross member 122, likewise of L section, is welded to the cross frame member 8 and carries thereon a hydraulic pump 124, preferably so constructed that it may be operated by a pump lever 126 moving substantially in a horizontal plane, so that it will not interfere with the overhanging platform. From the pump 124 a tube 128 extends to the cylinder 72 to transmit thereto the plunger operating liquid under hydraulic pressure. The release valve, to permit the liquid to flow from the cylinder 72 back to the pump 124, may be operated from a shaft 130, having thereon a crank arm 132 connected to a slide rod 134, provided with a knob 136 and arranged to be held either in its open or its closed condition by a spring clamp 138.

As hereinabove pointed out, not only is control of the straightening and collapsing movements of the toggle linkages to insure elevating and lowering movements of the platform in vertical parallelism an important feature of the invention, but a further important feature of the invention is control of these straightening and collapsing movements in such manner as to insure horizontal parallelism of the platform during its elevating and lowering movements.

Referring to the drawings, it will be seen that the platform 10 extends some distance in front of the forward pivots 34 and also some distance to the rear of the rear pivots 34. It will therefore be seen that it is possible so to load the platform 10, either in front of the forward pivots 34 or behind the rear pivots 34, that the platform itself would tend to rock about these pivots 34 as fulcrums, thus tending to effect a toggle straightening pull on the toggle linkages at the less loaded end of the platform. To prevent such an action and insure maintenance of the platform 10 in its horizontal position throughout the elevating and lowering movements thereof is, as above stated, an important feature of the invention. As herein shown, such rocking of the platform 10, either about the front pivots 34 as fulcrums or about the rear pivots 34 as fulcrums, in the case of an unbalanced load, is prevented by so connecting the front and rear pivots 66 on the extensions 54 of the links or levers 26 on each side of the elevating mechanism that neither pivot 66 can move forwardly or rearwardly independently of the other pivot 66 on the same side. As herein shown, this connection of the pivots 66 on either side of the elevating mechanism is effected by means of a rod 140, threaded at each end and received at each end in an elongated opening in the enlarged lower part 142 of a rod connector 144. The flat upper part of the connector 144 is pivoted on the spacing washer 7, between the nut 70 and the link or lever 26 which permits the extension 54 of the link or lever 26 to turn with said pivot 66 independently of the rod connector 144. The rod 140 is preferably threaded for a sufficient distance from each end so that it can receive nuts 146 and 148 at each end of the enlargement 142 of the rod connector 144, thus providing for adjustment of the pivots 66 into proper spaced relation to each other. If desired, since the movement of the rod 140, together with the rollers 56 and pivots 66, is a straight line movement, rod guides 150 may be provided on the side members 2 and 4 of the support frame.

From the foregoing description it will be seen that, even though a load be placed in front of the front pivots 34 or behind the rear pivots 34, it will not cause rocking of the platform about either of these pairs of pivots as fulcrums, since movement of the opposite toggles toward straightened position by uptilting of the less loaded end of the platform 10, which must take place to permit this rocking movement, is prevented by reason of the fact that the necessary forward movements of the pivots 66 of the toggle linkages at the less loaded end cannot take place independently of the pivots 66 of the linkages of the loaded end since the pivots 66 on each side of the elevating mechanism are interconnected by the rods 140, there being a rod 140 between each front and rear pivot 66 on each side of the elevating mechanism, as hereinabove pointed out.

Referring to Figure 1, it will be seen that the web or plate 42, through which the pivot 40 for the hub 38 extends, also serves as the support for the ramp 114. This plate or web 42 may be welded to the web portion of the longitudinal frame channel 2 or 4 of the chassis top frame and may be provided with a reinforcement 152 where the pivot 40 passes therethrough. The plate or web 42 is of such shape in side elevation, as shown in Figures 1 and 2, that it provides the required inclined support for the ramp 114.

From the foregoing description, it will be seen that the elevating mechanism of the present invention has a wide range of utility in the material handling field. This mechanism, as shown in the drawings, can, as suggested, be mounted upon the chassis of an ordinary express truck and serve to provide such express truck with a vertically adjustable platform to facilitate loading and unloading express cars, or it can be mounted upon any other structure to superimpose thereon an elevating mechanism having a very low collapsed height and capable of providing a considerable range of elevating and lowering movement. Although the elevated height of the mechanism, as it is shown in the drawings, is about three and one-half times its collapsed height, it will be apparent that by increasing the lengths of the toggle links, with such increase of the overall length and of the overall height of the elevating mechanism as may be required to accommodate such increase in length of the toggle members and also to accommodate any changes in the dimensions of the means for applying toggle straightening power thereto, an even greater ratio of elevated to collapsed height may be obtained.

It will further be seen that, by collapsing the toggles rearwardly, a considerable overhang of the front end platform over the support for the elevating mechanism may be provided in a structure in which the platform is symmetrically supported on the toggle linkages, thus providing space for the hydraulic pump in a self-contained unit. It will also be seen that, by reason of the provision of the novel means for confining the elevating and lowering movements of the platform to vertical parallelism, no substructure or superstructure is required upon the support for the elevating mechanism in order to accommodate the fixed vertical guides which would otherwise be required to obtain the same result.

As hereinabove pointed out, the use of the hydraulic means for applying lifting power to the toggle mechanism of the present invention, in combination with the means by which a substantially uniform lifting effort is provided at all stages of the lifting and lowering operations, insures good control of the load at all such stages.

What is claimed as new is:

1. In platform elevating means, the combination with the platform to be elevated and a support for the elevating mechanism, of a toggle linkage pivotally connected at its respective ends to said platform and to said support, the platform-connected member of said linkage having an extension beyond the toggle knee substantially equal to its knee to platform pivot length, cooperating means on said support and on said extension to confine the end of said extension to rectilinear movement normal to the platform elevating movement during the toggle straightening operation and means movable over said support, arranged to engage between the support and the toggle link pivoted thereon, when said link is in its prone position, and freely slidable lengthwise of said link for effecting a toggle straightening movement of said link about its support pivot.

2. Platform elevating means according to claim 1 in which the support-connected member of the toggle linkage has also an extension beyond the toggle knee for cooperation with the toggle straightening means during the initial toggle straightening movement thereof.

3. Platform elevating means according to claim 1 in which toggle straightening means comprises a support-carried hydraulic cylinder and plunger, the plunger being arranged to slidably engage and swing said support-connected toggle link about its support pivot in the toggle straightening direction.

4. Platform elevating means according to claim 1 having therein toggle straightening means comprising a support-carried hydraulic cylinder and plunger, the plunger being provided with a roller which operatively engages an edge of the support-connected member of said toggle linkage.

5. Platform elevating means according to claim 1 having therein toggle straightening means comprising a hydraulic cylinder and plunger mounted on the support to swing in a vertical plane, said plunger being provided with a roller which engages an edge of the support-connected member of said toggle linkage, a second coaxial plunger-guiding roller being also carried by said plunger and a ramp being provided on said support up which said last mentioned roller travels during the toggle-straightening movement.

6. Platform elevating means according to claim 1 in which front and rear pairs of laterally spaced which the extensions of the platform-connected but not cross-connected toggle linkages between the platform and support provide four-point application of lifting power to the platform and in members of the front and rear linkages on each side are connected to each other for movement in unison.

7. Platform elevating means according to claim 1 in which front and rear pairs of laterally spaced toggle linkages between the platform and support provide four-point application of lifting power to the platform and in which a rectangular frame, mounted and guided on said support for movement lengthwise thereof, is provided with means for simultaneously and equally applying toggle straightening force to said toggle linkages when power is applied to said frame to effect such lengthwise movement.

8. Platform elevating means according to claim 1 in which front and rear pairs of laterally spaced toggle linkages between the platform and support provide four-point application of lifting power to the platform and in which a rectangular frame, mounted and guided on said support for movement lengthwise thereof, is provided with means for simultaneously and equally applying toggle straightening force to said toggle linkages when power is applied to said frame to effect such lengthwise movement, the mounting of said frame on said support including ramps up which the corners of said frame ride during the toggle straightening movement thereof.

9. Platform elevating means according to claim 1 in which front and rear pairs of laterally spaced toggle linkages between the platform and support provide four-point application of lifting power to the platform and in which a rectangular frame, mounted and guided on said support for movement lengthwise thereof, is provided with means for simultaneously and equally applying toggle straightening force to said toggle linkages when power is applied to said frame to effect such lengthwise movement, hydraulic means being carried by said support for effecting the lengthwise movement of said frame.

10. In platform elevating means, the combination with the platform to be elevated and a support for the elevating mechanism, of platform elevating mechanism comprising a link having at one end a pivotal connection to the platform and having pivoted upon its other end a track engaging roll, said support having thereon a horizontal track on the under side of which said roll travels, a second link having a pivotal connection to said support and also having a pivotal connection to the first-mentioned link at a point equidistant from all three of said aforementioned pivots, and means movable over said support, arranged to engage between the support and said second link pivoted thereon, when said second link is in its prone position, and freely slidable lengthwise of said link for effecting a toggle straightening movement of said link about its support pivot.

11. In platform elevating means, the combination with the platform to be elevated and a support for the elevating mechanism, of front and rear pairs of laterally spaced toggle linkages, each pivotally connected at its respective ends to said platform and to said support, a rectangular frame mounted and guided on said support for movement lengthwise thereof and having thereon means for simultaneously and equally applying toggle straightening force to said toggle linkages when power is applied to said frame to effect said lengthwise movement thereof and ramps up which the corners of said frame ride during the aforementioned lengthwise movement.

12. Platform elevating means according to claim 11 in which the frame-carried means for applying toggle straightening force comprise a roller for each toggle linkage so carried by the frame that it engages the edge of the support-connected link of the toggle and rides thereover as it moves said link about its support pivot in the toggle-straightening direction.

13. Platform elevating means according to claim 11 in which the platform connected member of each toggle linkage has an extension beyond the toggle knee substantially equal to its knee to platform pivot length and in which cooperating means on said support and on said extension confine the end of said extension to horizontal movement during the toggle-straightening operation.

14. Platform elevating means according to claim 11 in which the platform connected member of each toggle linkage has an extension beyond the toggle knee substantially equal to its knee to platform pivot length and in which cooperating means on said support and on said extension confine the end of said extension to horizontal movement during the toggle-straightening operation, the extensions of the platform connected members of the front and rear linkages on each side of the elevating mechanism being connected to each other for movement in unison.

15. Platform elevating means according to claim 1 in which the support is provided with a ramp up which said link engaging means travels in its toggle straightening movement.

16. Platform elevating means according to claim 10 in which the support is provided with a ramp up which said means engaging the second link travels in its toggle straightening movement.

CHRISTIAN D. GIBSON.

REFERENCES CITED

The following references are of record in the file of this patent:

UNITED STATES PATENTS

| Number | Name | Date |
| --- | --- | --- |
| 1,182,249 | Chase et al. | May 9, 1916 |
| 2,099,903 | Nilson | Nov. 23, 1937 |
| 2,206,788 | Meacham | July 2, 1940 |

FOREIGN PATENTS

| Number | Country | Date |
| --- | --- | --- |
| 407,239 | Great Britain | Mar. 15, 1934 |